United States Patent [19]
Zmyslowski

[11] Patent Number: 5,603,153
[45] Date of Patent: Feb. 18, 1997

[54] METHODOLOGY FOR FORMING STAMPED SHEET METAL PARTS OF COMPLEX CONFIGURATION

[75] Inventor: Mark Zmyslowski, Grosse Pointe Shores, Mich.

[73] Assignee: Radar Industries, Inc., Roseville, Mich.

[21] Appl. No.: 430,337

[22] Filed: Apr. 28, 1995

[51] Int. Cl.⁶ ........................................................ B23P 11/00
[52] U.S. Cl. ............................ 29/509; 29/432.1; 29/417; 29/34 R; 72/404
[58] Field of Search ............................ 29/509, 521, 524, 29/432, 432.1, 417, 11, 243.5, 34 R; 72/404

[56] References Cited

U.S. PATENT DOCUMENTS

| | | |
|---|---|---|
| 1,107,808 | 8/1914 | Locke . |
| 1,189,562 | 7/1916 | Groehn et al. . |
| 1,448,663 | 3/1923 | Hoya . |
| 1,707,043 | 3/1929 | Betterndorf ............................ 29/11 X |
| 3,058,146 | 10/1962 | Harrison et al. . |
| 3,123,170 | 3/1964 | Bryant . |
| 3,673,794 | 7/1972 | I'Anson . |
| 4,356,719 | 11/1982 | Sutherland et al. .................. 72/404 X |
| 4,579,184 | 4/1986 | Hiramoto . |
| 4,603,454 | 8/1986 | Janssen, Jr. et al. ................. 72/404 X |
| 4,734,971 | 4/1988 | Dupasquier ............................ 29/417 |
| 4,766,968 | 8/1988 | Matsunaga . |
| 4,803,767 | 2/1989 | Obrecht et al. . |
| 4,836,741 | 6/1989 | St. Louis et al. . |
| 4,897,912 | 2/1990 | Slasinski ............................ 29/521 X |

FOREIGN PATENT DOCUMENTS 0510569  10/1930  Germany ................................ 72/404

*Primary Examiner*—Peter Vo
*Assistant Examiner*—Khan Nguyen
*Attorney, Agent, or Firm*—Young & Basile, P.C.

[57] ABSTRACT

A method and apparatus for forming sheet metal parts of complex configuration and/or sheet metal parts including inherent joints. The part is formed in a continuous run through a stamping press wherein a strip of sheet metal is moved incrementally and continuously through a plurality of successive stations where a plurality of hits are made on the sheet to successively cut and form the sheet to gradually form the individual stamped parts. A special compound die is disclosed for forming a complete loop in each part during the run through the stamping press and for forming a doubled over portion of the part including upper and lower layers, and a clinching station is provided as a station within the stamping press for mechanically joining the doubled over layers of the part together to form a successive plurality of separate parts each having a doubled over portion clinched together.

5 Claims, 4 Drawing Sheets

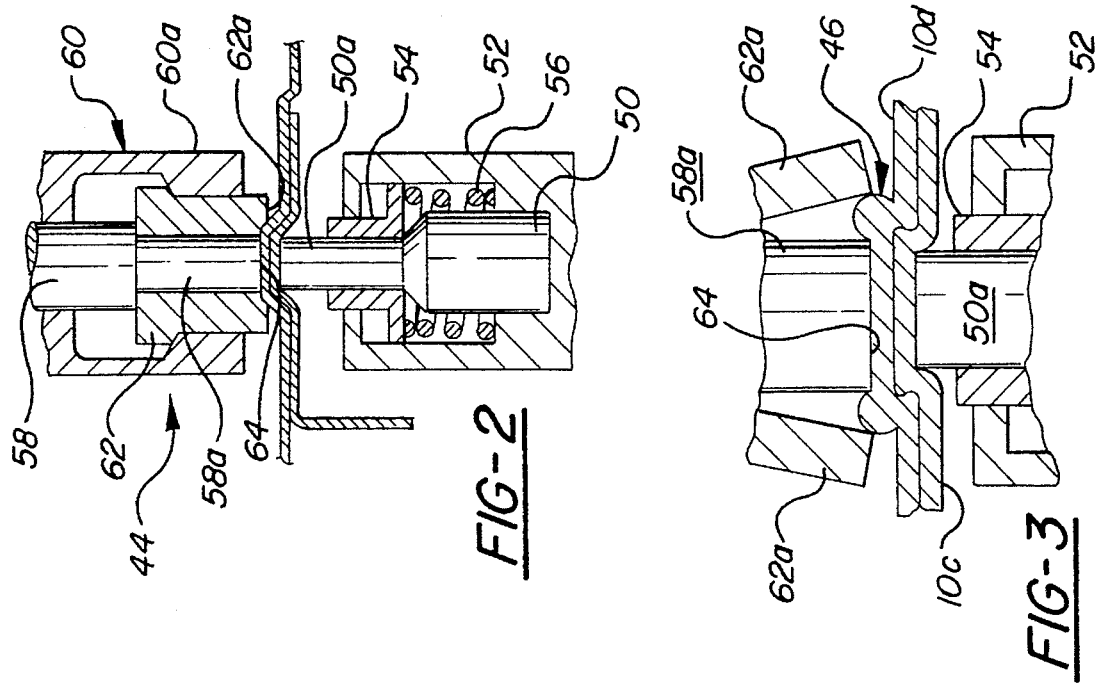
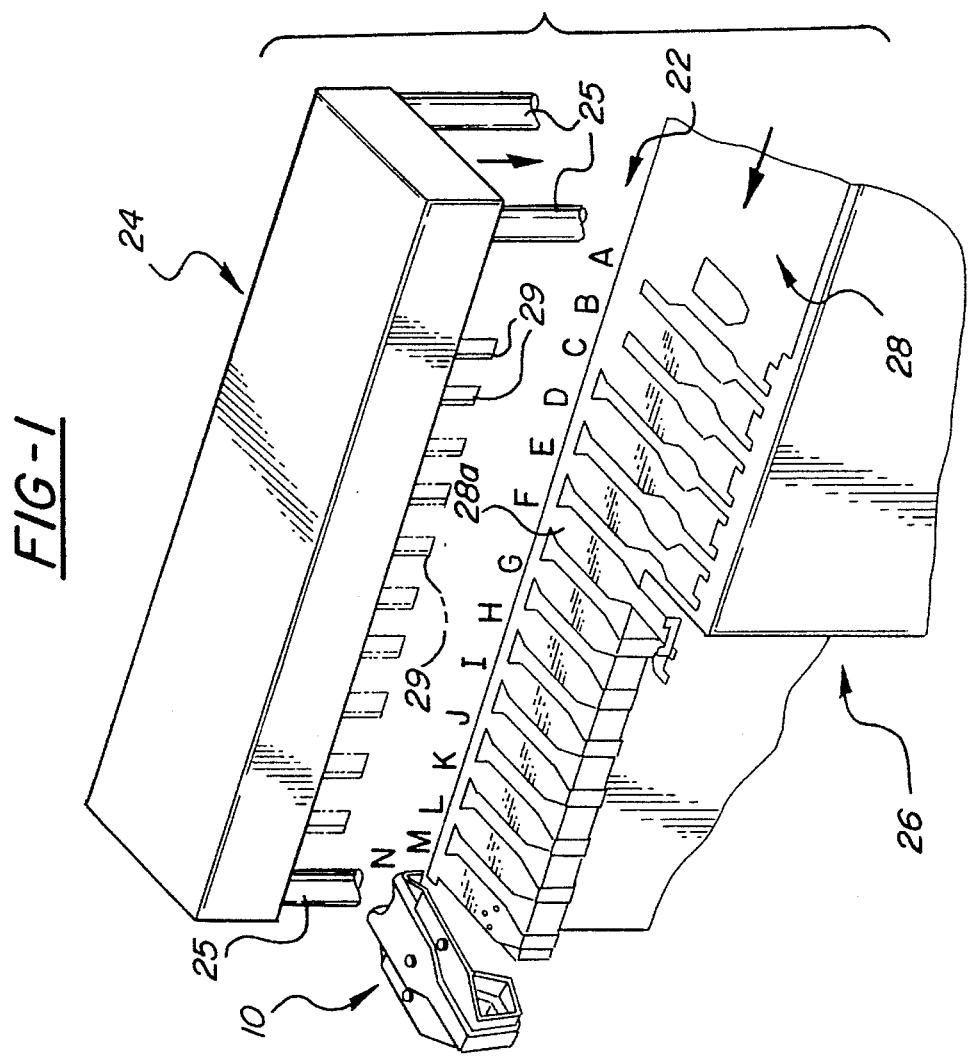

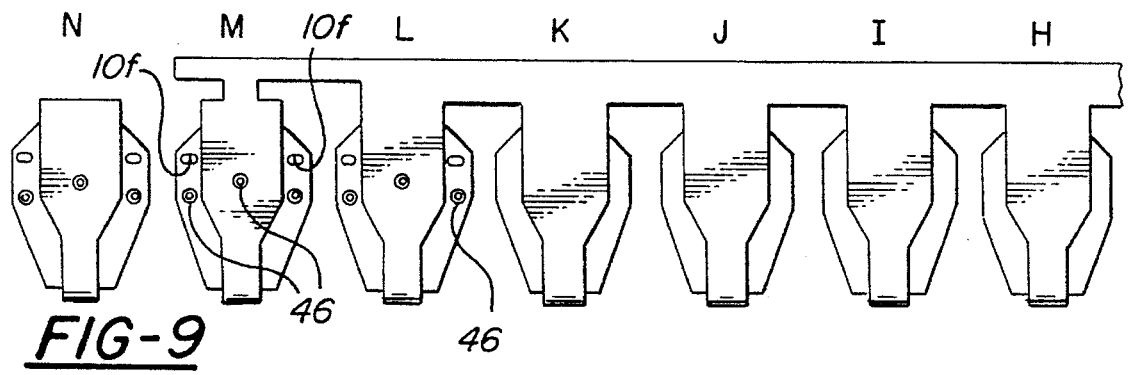
FIG-9
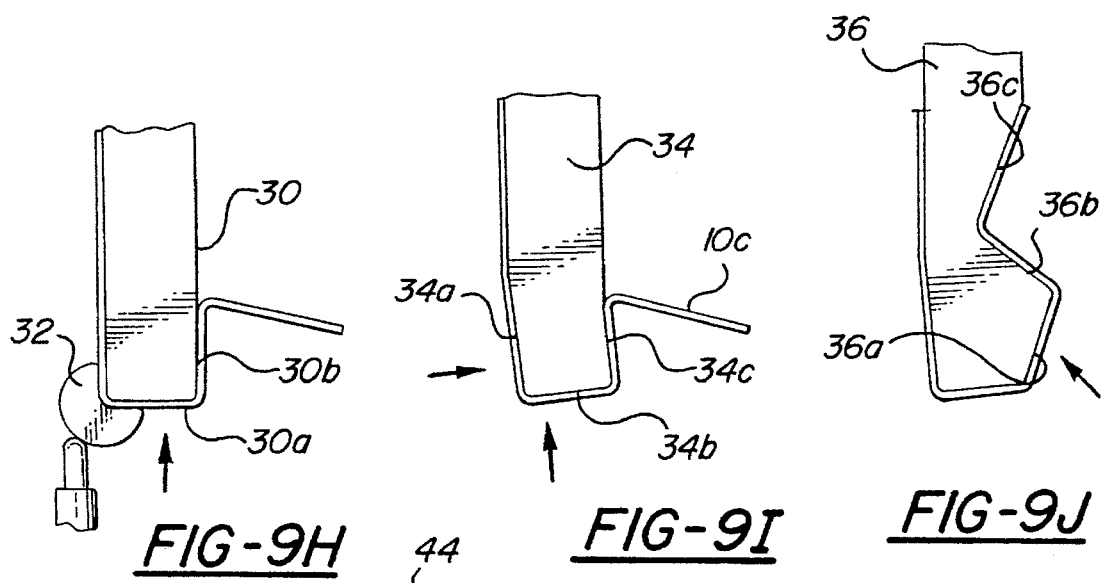
FIG-9H
FIG-9I
FIG-9J
FIG-9L
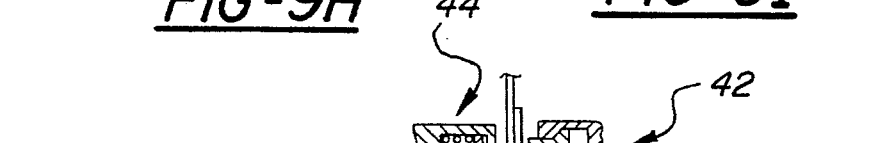
FIG-9K
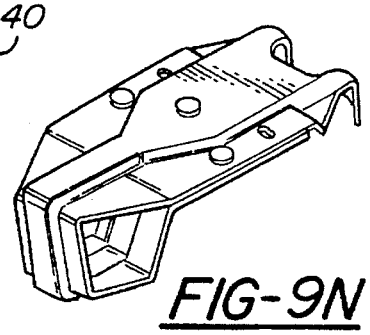
FIG-9N
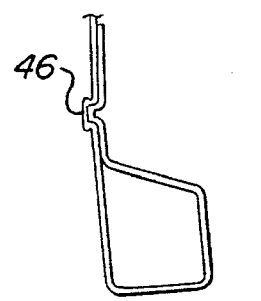
FIG-9M

5,603,153

METHODOLOGY FOR FORMING STAMPED SHEET METAL PARTS OF COMPLEX CONFIGURATION

BACKGROUND OF THE INVENTION

This invention relates to stamping operations and more particularly to the formation of stamped sheet metal parts of relatively complex configuration.

Stamped sheet metal parts are widely used in industry including, for example, the automotive industry. Whereas stamped sheet metal parts have the advantage of being relatively inexpensive as compared to similar parts made utilizing other technologies such as casting or forging, the basic nature of the stamping operation limits the characteristics of the parts that can be formed using this technology. In general, parts that have a relatively complex configuration and/or parts that include inherent joints in the parts do not lend themselves to a stamping operation.

SUMMARY OF THE INVENTION

This invention is directed to the provision of an improved apparatus and methodology for forming stamped sheet metal parts.

More specifically, this invention is directed to the provision of an apparatus and methodology for forming stamped sheet metal parts of relatively complex configuration.

Yet more specifically, this invention is directed to the provision of an apparatus and methodology for forming sheet metal parts of a complex configuration and including one or more inherent joints in the part.

The invention methodology concerns feeding a sheet of sheet metal continuously and incrementally through a stamping press including a ram and a plurality of successive stations at which operations are performed in response to ram movement. According to the invention, the sheet is struck at a plurality of successive forming stations with successive hits in response to ram movement to form a plurality of separate but joined together parts each including a doubled over portion including upper and lower layers; at a further successive station following the station at which the doubled over portion is formed, the doubled over portions are clinched together in response to ram movement to mechanically joint the upper and lower layers; and thereafter, at a further successive station, the individual parts are severed to form a successive plurality of parts each having a doubled over portion clinched together. This apparatus and methodology allows the formation of sheet metal parts of relatively complex configuration and including inherent joints.

According to a further feature of the invention, each part is initially formed at the plurality of successive stations so as to extend laterally outwardly from a common longitudinal strip joining all of the individual parts; and the free laterally outer end region of each part is thereafter folded downwardly, laterally inwardly, and upwardly to form a loop proximate the laterally outward end of the part and to dispose the extreme free end portion of the part beneath and proximate the main body portion of the part laterally inwardly of the loop so that the extreme free end portion defines the lower layer of the doubled over portion and the adjacent overlying section of the main body portion defines the upper layer of the doubled over portion. This apparatus and methodology allows the ready and efficient formation of a stamped sheet metal part including an inherent loop in the part and including an inherent joint in the part.

According to a further feature of the invention, the clinching operation is performed by disposing a punch at the furthest successive station proximate one layer of the doubled over portion of the respective part, disposing a coacting clinching die proximate the other layer of the doubled over portion of the respective part, and moving the punch into coaction with the clinching die in response to ram movement whereby to clinch the layers together. This apparatus and methodology allows the utilization of known and reliable clinching technology to form the joint in the part.

According to a further feature of the invention, stamping dies are positioned at successive stations for respective coaction with the ram movement to successively form the parts as the sheet moves longitudinally and incrementally through the stamping press; the penultimate and the final steps in the formation of the loop are performed at a penultimate loop forming station and a final loop forming station; a common die is positioned at the penultimate loop forming station and the final loop forming station including a die main body portion positioned at the penultimate loop forming station and defining a laterally outer surface for use in performing the penultimate loop forming step and a horn extending forwardly from the die main body portion to the final loop forming station and defining longitudinally extending surfaces for use in performing the final loop forming steps; and in the final formation of the loop, the loop loops around the horn to position the extreme free end portion of the part beneath the main body portion of the part laterally inwardly of the horn. This specific compound die for positioning at the penultimate and the final loop forming station of the press allows the ready and efficient formation of the loop in a continuous stamping operation.

BRIEF DESCRIPTION OF THE DRAWINGS

FIG. 1 is a schematic view of a stamping press and a stamping operation according to the invention;

FIGS. 2 and 3 are detail views showing a clinching operation performed as a part of the invention methodology;

FIG. 9 is a plan view showing the movement of a part through various steps in the invention methodology;

FIGS. 9H through 9N show details of the operation performed at each of the stations H through N illustrated in FIG. 9.

DETAILED DESCRIPTION OF THE PREFERRED EMBODIMENT

Figure 4:
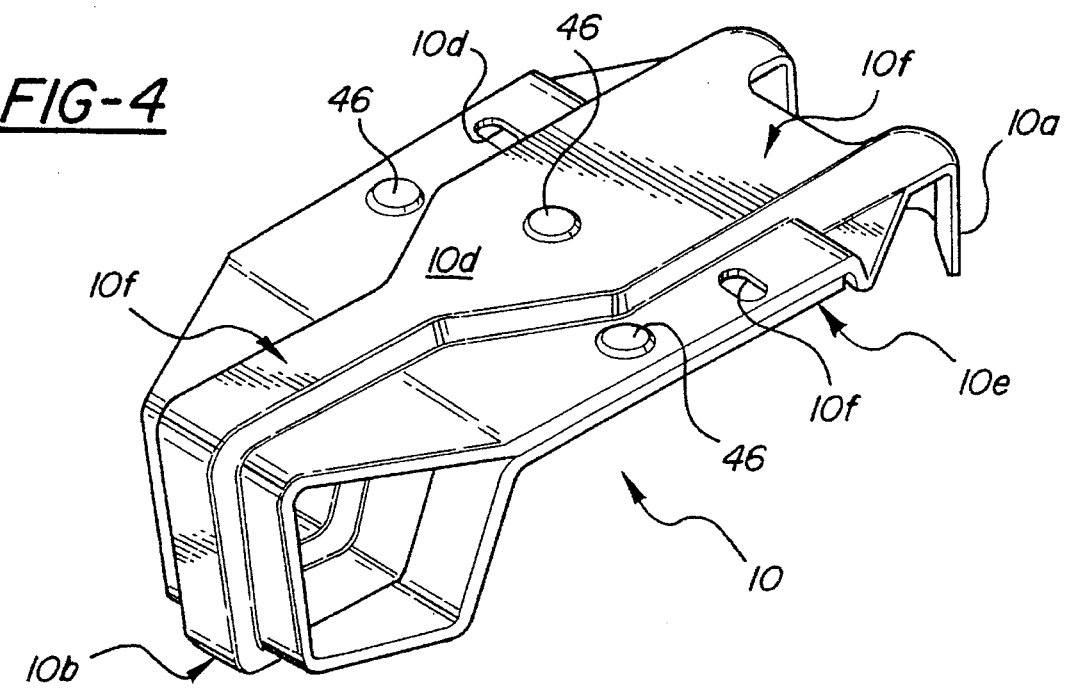
FIGS. 4, 5 and 6 are detail views of a part made in accordance with the invention methodology.
Figure 5:
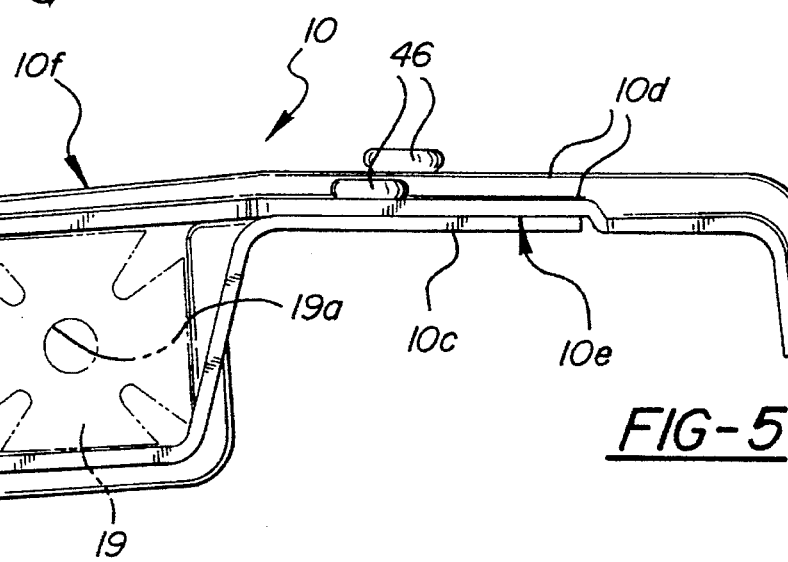
Figure 6:
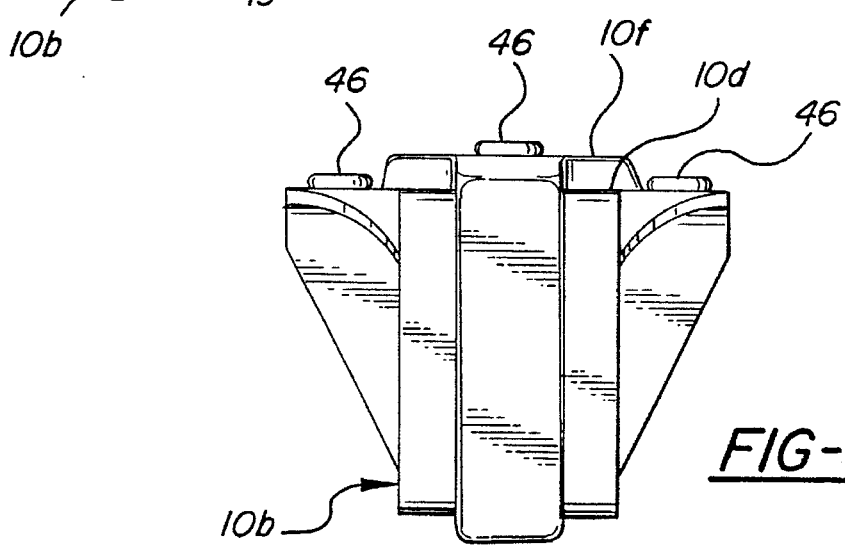
Figure 7:
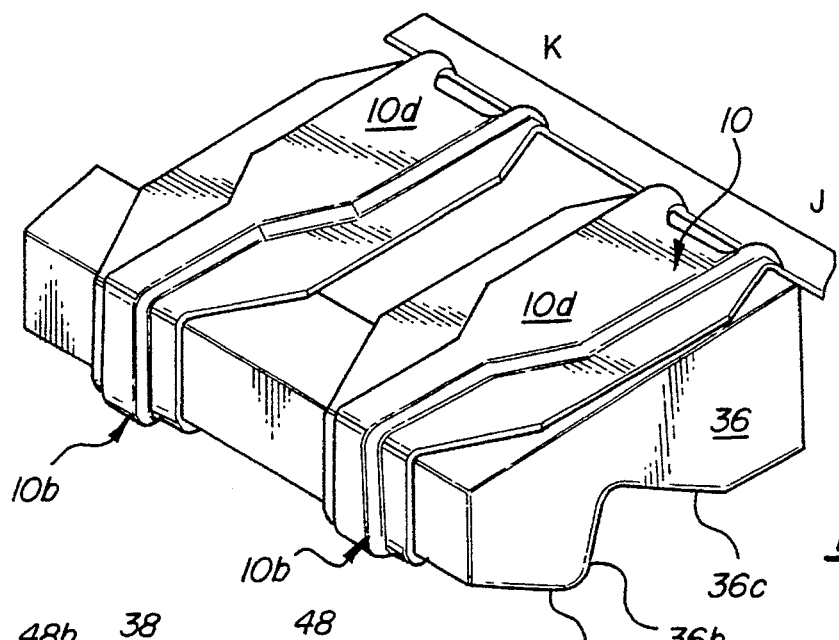
FIGS. 7 and 8 are detail views of a die utilized in performing the invention methodology.
Figure 8:
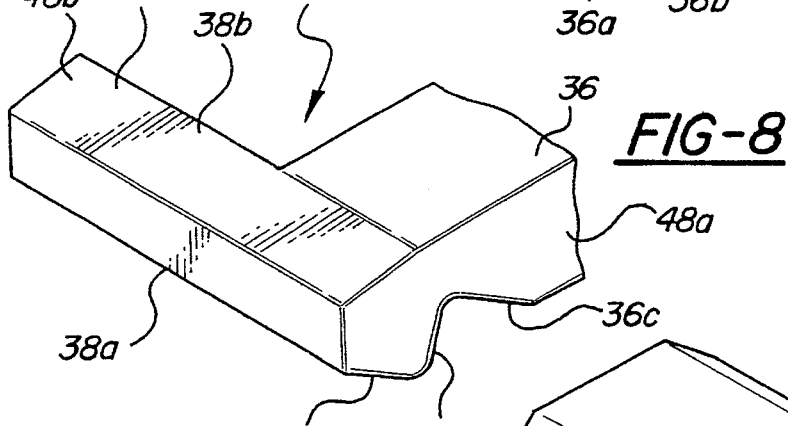
Figure 10:
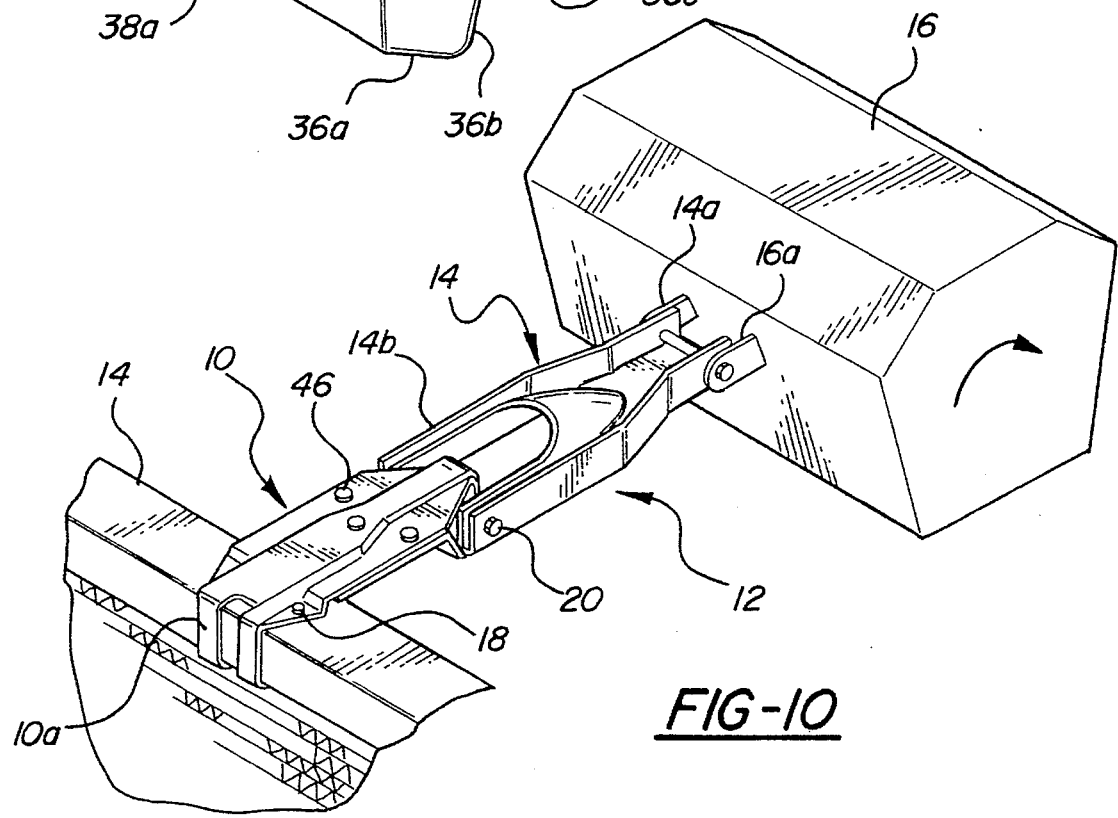
FIG. 10 is a fragmentary perspective view of a motor vehicle showing a linkage assembly including the part formed in accordance with the invention.

The invention is described with respect to the formation of a radiator tie bar bracket 10 forming a part of a linkage assembly 12 connecting the radiator tie bar 14 of a motor vehicle and an east/west mounted engine 16 forming a part of a front wheel drive assembly for the motor vehicle. The linkage assembly 12 further includes a link 14 pivotably secured at its rearward end 14a by a pin 16 to the engine 16 utilizing, for example, lugs or tabs 16a. Bracket 10 is fixedly secured at its forward end 10a to the radiator tie bar 14 as by bolts 18 and defines a socket or loop 10b at its rearward end receiving a rubber bushing or biscuit 19 defining a cylindrical central transverse bore 19a. The forward end 14b of link 14 is pivotally secured to the rearward end of the bracket by a pivot pin 20 pivotally engaging the rearward end of the link and positioned in the bore 19a of the biscuit 19. Assembly 12 will be seen to limit the torque induced rotation of the engine in known manner.

The invention is carried out utilizing a stamping press 22 of generally known configuration and operation and including a ram 24 and a bed 26 positioned beneath the ram. The ram 24 is arranged to move up and down with respect to the bed 26 in known manner utilizing guide rods 25 so as to cooperate with dies positioned at successive stations along the bed to perform successive cutting and forming operations with respect to a sheet of sheet metal as the sheet is moved successively and incrementally along the bed in known manner. Individual stations along the bed are indicated in FIG. 1 by the letters A through N and it will be understood that the sheet is fed continuously but incrementally along the bed so as to pause at each work station. It will be further understood that at each pause at a respective workstation the ram moves downwardly and cam members 29 carried by the ram coact in known manner with dies positioned at the respective work station to perform a cutting or forming operation on the sheet.

Specifically, and as best seen in FIG. 1, as the sheet moves successively and incrementally from station A through stations E, successive cuts and forming operations are performed on the sheet at the successive stations to outline successive parts 10 extending laterally from a common joinder strip 28a. Thereafter, at successive stations F through K, the loop 10b is formed in the free end of the part whereafter, at station L, a clinching operation is performed whereafter, at station M, a piercing operation is performed whereafter, at station N, a severing operation is performed to sever the individual part 10 from the strip 28a to form the completed part.

The cutting and forming operations performed at stations A through E are of known form and will not be further described except to note that in each case and at each station, downward movement of the ram as the sheet pauses at that station has the effect, via cam members 29, of performing a specific cutting or forming operation at that station depending upon the nature of the specific die positioned at that station.

Beginning at station F, and continuing through station K, the free laterally outer end region of each part is folded downwardly, laterally inwardly, and upwardly to form the loop 10b. Specifically, at station 9F, an extreme free end portion 10c of the part is defined; at station 9G, an initial downward bend is made in the outer end region of the part; at station 9H, a cam member 29, die 30, and a readibender or rollerbender 32 coact in response to downward movement of the ram to fold the outer end region of the part over the outer edge 30a of the die and the lower edge 30b of the die; at station 9I, a die 34 coacts with a cam member 29 in response to downward movement of the ram to further fold the outer end region of the part in conformity with the faces 34a, 34b, and 34c of the die to further form the outer end region; at station 9J a die 36 coacts with forming devices of known form in response to downward movement of the ram to conform the outer end region of the part to the surfaces 36a, b, and c of the die; at station 9K a die 38 cooperates with a readibender or rollerbender 40 in response to downward movement of the ram to further conform the outer end region of the part to the surfaces 38a and 38b of the die 38 and to position the extreme free end portion 10c of the part beneath and proximate the main body portion 10d of the part laterally inwardly of the loop 10b so that extreme free end portion 10c forms the lower layer of a doubled over portion 10e of the part; at station 9L a plurality of clinching punches 42 respectively coact with a plurality of clinching dies 44 in response to downward movement of the ram to form a plurality of clinched joints 46 mechanically and fixedly binding the lower layer 10c to the main body upper layer 10d; at station 9M a punch (not shown) operates in response to downward movement of the ram to form slots 10f in the part; and at station 9N a severing device (not shown) operates in response to downward movement of the die to separate the part from the joinder strip 28a and form the completed part.

With particular reference to the forming operations performed at stations 9J and 9K, the forming operations performed at these two successive stations are performed utilizing a common compound die 48 of L configuration positioned at these stations. The main body portion 48a of die 48 is constituted by the die 36 positioned at station 9J and the forwardly extending horn portion 48b of the die is constituted by the die 38 positioned at the station 9K. Die 38 thereby constitutes the forwardly extending horn portion of the die 48 so that the die 36 may be positioned at station 9J to perform forming operations utilizing surfaces 36a, 36b and 36c and the horn portion 38 may extend forwardly to the station 9K where the surfaces 38a and 38b may coact with the readibender or rollerbender 40 to complete the formation of the loop 10b and position the extreme free end portion 10c of the part in underlying relation to the main body portion 10d of the part preparatory to the clinching operation performed at station 9L. It will be seen that the use of the compound die 48 facilitates the formation of the loop 10b and the positioning of the free end portion 10c in doubled relation to the main body portion 10d by providing a cantilever horn portion around which the loop can be looped.

At the clinching station 9L, three clinching punches 42 may be arranged for respective clinching coaction with three clinching dies 44 to form three clinched joints 46 across the width of the part whereby to fixedly and rigidly secure the free end portion 10c to the main body portion 10d and thereby fixedly and rigidly define the loop 10b.

Punches 42 and dies 44 may take any of several known forms. For example, and as illustrated in FIGS. 3 and 4, each punch 42 may include a punch pin 50a, a punch retainer 52, a stripper 54, and a compression spring 56, and each clinching die 44 may include a die pin 58, a collet 60 including a plurality of circumferentially spaced finger portions 60a, and a split bushing 62. As each clinching punch is moved upwardly with respect to the respective clinching die in response to downward movement of the ram, the free or upper end 50a of punch pin 50 contacts lower layer 10c and, with continued upward movement, causes the adjacent material of layers 10c and 10d to flow into the recess 64 defined between the tip 58a of die pin 58 and the lower end 62a of bushing 62. As the punch continues upwardly, the bushing halves move radially outwardly relative to the central axis of the clinching tool under the resistance of collet fingers 60a to allow the adjacent material of layers 10c and 10d to flow radially outwardly into the annular space defined by the retreating bushing halves to form the clinch joint 46. As the ram again moves upwardly, the punches are moved downwardly and the strippers 54 operate in known manner to strip the clinched part from the punch.

Following the clinching operation, and as previously described, the part is incrementally moved to station 9M where, in response to the next downward movement of the ram, slots 10f are formed in a piercing operation whereafter the part is moved incrementally to severing station 9N where, in response to the next downward movement of the ram, the part is severed from the common strip 28a to form the completed part.

It will be understood that, in accordance with known stamping press technology, the dies and forming devices positioned at the various stations are spring mounted to move downwardly with each successive hit of the ram and the downward movement of the dies and forming devices at a particular station assists in the forming operation performed at that station. As the ram moves back upwardly, the dies are spring biased back up to die level along with the sheet and the incremental movement of the sheet to the next progressive station occurs at die level.

It will be seen that each part 10 includes a reinforcing rib 10f extending the entire length of the part and it will be understood that the extreme free end portion 10c of each part has a compound cross-sectional configuration corresponding to the compound cross-sectional configuration imparted to the main body portion 10d of the part by virtue of the rib 10f so that, as the extreme free end portion 10c is moved to a position proximate and beneath the main body portion 10d, the compound cross-sectional configuration of portion 10c nests within the corresponding cross-sectional configuration of portion 10d. The rib 10f is formed in known manner between stations A and E.

The invention will be seen to provide a method and apparatus for readily and efficiently forming stamped sheet metal parts of complex configuration and/or including inherent joints. More specifically, the invention apparatus and methodology allows the formation of complex jointed sheet metal parts in a single continuous run through a stamping press, whereby to eliminate the need for any follow-on or ancillary operations following the movement through the stamping press and thereby preserve the inherent and critical cost effectiveness of the basic stamping operation.

Whereas the preferred embodiment of the invention has been illustrated and described in detail it will be apparent that various changes may be made in the disclosed embodiment with departing the scope or spirit of the invention.

I claim:

1. A method for forming sheet metal parts comprising:

feeding a sheet of metal material continuously and longitudinally through a stamping press including a ram and a plurality of successive stations at which operations are performed in response to ram movement;

at a plurality of longitudinally successive stations, striking the sheet with successive hits in response to ram movement to form a plurality of parts joined together by and extending laterally from a common strip and each including a main body portion joined to the strip and an outer end region having an extreme free end portion;

at a further successive station, folding the outer end region of each part back upon the main body portion to form a loop having an open configuration and position the extreme free end portion proximate the main body portion to close the entry to the loop and form a doubled-over portion including upper and lower layers;

at a yet further successive station, following the station at which the doubled-over portion is formed, clinching the upper and lower layers of the doubled-over portions together in response to ram movement to form at least one clinched joint mechanically joining the upper and lower layers to fixedly close the entry to the loop while retaining the open configuration of the loop; and thereafter, at a still further successive station, severing the individual parts to form a successive plurality of separate parts each having a loop and a doubled-over portion closing the entry to the loop and including upper and lower layers mechanically joined by at least one clinched joint.

2. A method according to claim 1 wherein:

the outer end region of each part comprises a laterally outer end region and is folded downwardly, laterally inwardly, and upwardly to form the loop proximate the laterally outer end of the part and to dispose the extreme free end portion of the part beneath and proximate the main body portion of the part laterally inwardly of the loop so that the extreme free end portion defines the lower layer of the doubled-over portion and the adjacent overlying section of the main body portion defines the upper layer of the doubled-over portion.

3. A method according to claim 2 wherein:

the clinching operation is performed by disposing a punch at the yet further successive station proximate one layer of the doubled-over portion of the respective part, disposing a coacting clinching die proximate the other layer of the doubled-over portion of the respective part, and moving the punch into coaction with the clinching die in response to ram movement whereby to clinch the layers together and form a clinched joint at a location laterally inwardly of the loop.

4. A method according to claim 3 wherein:

the punch is disposed beneath the lower layer of the doubled over portion;

the clinching die is disposed above the upper layer of the doubled over portion; and the punch is moved upwardly into coaction with the clinching die in response to ram movement.

5. A method for forming sheet metal parts comprising:

feeding a sheet of metal material continuously through a stamping press including a ram and a plurality of successive stations at which operations are performed in response to ram movement;

at a plurality of successive stations, striking the sheet with successive hits in response to ram movement to form a plurality of parts joined together by and extending laterally outwardly from a common strip and each including a main body portion and a doubled-over portion including upper and lower layers;

at a further successive station following the station at which the doubled-over portion is formed, clinching the doubled-over portions together in response to ram movement to mechanically join the upper and lower layers; and thereafter, at a further successive station, severing the individual parts to form a successive plurality of separate parts each having a doubled-over portion clinched together;

a free laterally outer end region of each part being folded downwardly, laterally inwardly, and upwardly to form a loop proximate a laterally outer end of the part and to dispose an extreme free end portion of the part beneath and proximate the main body portion of the part laterally inwardly of the loop so that the extreme free end portion defines the lower layer of the doubled-over portion and an adjacent overlying section of the main body portion defines the upper layer of the doubled over portion;

the clinching operation being performed by disposing a punch at the further successive station proximate one layer of the doubled-over portion of the respective part, disposing a coacting clinching die proximate the other layer of the doubled-over portion of the respective part, and moving the punch into coaction with the clinching die in response to ram movement to clinch the layers together;

stamping dies being positioned at successive stations for respective coaction with the ram movement to successively form the parts as the sheet moves longitudinally through the stamping press;

the steps in the formation of the loop including a penultimate step and a final step;

the penultimate and final steps in the formation of the loop being performed at a penultimate loop forming station and a final loop forming station, respectively;

a common die being positioned at the penultimate loop forming station and the final loop forming station including a die main body portion positioned at the penultimate loop forming station and defining a laterally outer surface for use in performing the penultimate loop forming step and a horn extending forwardly from the die main body portion to the final loop forming station and defining longitudinally extending surfaces for use in performing the final loop forming steps;

in the final formation of the loop, the loop looping around the horn to position the extreme free end portion of the part beneath the main body portion of the part laterally inwardly of the horn.

* * * * *